United States Patent
Lee et al.

(10) Patent No.: US 12,092,863 B2
(45) Date of Patent: Sep. 17, 2024

(54) FABRICATION-TOLERANT ON-CHIP MULTIPLEXERS AND DEMULTIPLEXERS

(71) Applicant: Cisco Technology, Inc., San Jose, CA (US)

(72) Inventors: Yi Ho Lee, Breinigsville, PA (US); Tao Ling, Breinigsville, PA (US); Ravi S. Tummidi, Breinigsville, PA (US); Mark A. Webster, Bethlehem, PA (US); Prakash B. Gothoskar, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 17/451,247

(22) Filed: Oct. 18, 2021

(65) Prior Publication Data
US 2023/0119450 A1    Apr. 20, 2023

(51) Int. Cl.
    G02B 6/12       (2006.01)
    H04L 1/00       (2006.01)
    G02B 6/293      (2006.01)

(52) U.S. Cl.
    CPC ........ *G02B 6/12007* (2013.01); *H04L 1/0071* (2013.01); *G02B 2006/12107* (2013.01);
    (Continued)

(58) Field of Classification Search
    None
    See application file for complete search history.

(56) References Cited

U.S. PATENT DOCUMENTS 5,307,437 A * 4/1994 Facq ................. G02B 6/34
                                                        385/11
5,894,533 A * 4/1999 Heise ............... G02B 6/12019
                                                        385/27

(Continued)

FOREIGN PATENT DOCUMENTS

JP    2003177274 A      6/2003
WO   WO-0105082 A1 *   1/2001 ......... G02B 6/29317
WO    03089969 A2     10/2003

OTHER PUBLICATIONS

Hongnan Xu, Daoxin Dai, and Yaocheng Shi, "Low-Crosstalk and Fabrication-Tolerant Four-Channel CWDM Filter Based on Dispersion-Engineered Mach-Zehnder Interferometers," OSA Publishing/Optics Express, vol. 29, No. 13/21, Date Jun. 2021, pp. 1-15.

(Continued)

*Primary Examiner* — Chad H Smith
(74) *Attorney, Agent, or Firm* — Patterson + Sheridan, LLP

(57) ABSTRACT

Fabrication-tolerant on-chip multiplexers and demultiplexers are provides via a lattice filter interleaver configured to receive an input signal including a plurality of individual signals and to produce a first interleaved signal with a first subset of the plurality of individual signals and a second interleaved signal with a second subset of the plurality of individual signals; a first Bragg interleaver configured to receive the first interleaved signal and produce a first output signal including a first individual signal of the plurality of individual signals and a second output signal including a second individual signal of the plurality of individual signals; and a second Bragg interleaver configured to receive the second interleaved signal and produce a third output signal including a third individual signal of the plurality of individual signals and a fourth output signal including a fourth individual signal of the plurality of individual signals.

20 Claims, 14 Drawing Sheets

(52) U.S. Cl.
CPC .............. *G02B 2006/12164* (2013.01); *G02B 6/29352* (2013.01); *G02B 6/29386* (2013.01)

(56) References Cited

U.S. PATENT DOCUMENTS

| | | | |
|---|---|---|---|
| 5,953,467 | A | 9/1999 | Madsen |
| 10,852,472 | B1 | 12/2020 | Ling et al. |
| 10,935,726 | B1 | 3/2021 | Lee et al. |
| 10,935,738 | B1 | 3/2021 | Fincato et al. |
| 11,002,980 | B1 | 5/2021 | Ling et al. |
| 2017/0090122 | A1 | 3/2017 | Kato |
| 2018/0113253 | A1 | 4/2018 | Joo et al. |
| 2019/0079246 | A1 | 3/2019 | Shi |
| 2019/0212496 | A1 | 7/2019 | Karimelahi et al. |

OTHER PUBLICATIONS

S. Dwivedi, H. Dheer and W. Bogaerts, "Maximizing Fabrication and Thermal Tolerances of All-Silicon FIR Wavelength Filters," in IEEE Photonics Technology Letters, vol. 27, No. 8, pp. 871-874 (2015).

T.-H. Yen et. al., "Fabrication-Tolerant CWDM (de)Multiplexer Based on Cascaded Mach-Zehnder Interferometers on Silicon-on-Insulator," in Journal of Lightwave Technology, 39(1) 146-153 (2021).

Biswajeet Guha, et. al., "Minimizing temperature sensitivity of silicon Mach-Zehnder interferometers," Opt. Express 18, 1879-1887 (2010).

W. Bogaerts, Y. Xing and U. Khan, "Layout-Aware Variability Analysis, Yield Prediction, and Optimization in Photonic Integrated Circuits," in IEEE Journal of Selected Topics in Quantum Electronics, vol. 25, No. 5, pp. 1-13 (2019).

G. Gao, D. Chen, S. Tao, Y. Zhang, S. Zhu, X. Xiao, and J. Xia, "Silicon nitride O-band (de)multiplexers with low thermal sensitivity," Opt. Express 25, 12260-12267 (2017).

C. Mikkelsen, A. Bois, T. Lordello, D. Mahgerefteh, S. Menezo, and J. K. S. Poon, "Polarization-insensitive silicon nitride Mach-Zehnder lattice wavelength demultiplexers for CWDM in the O-band," Opt. Express 26, 30076-30084 (2018).

Shiqi Tao, Qingzhong Huang, Liangqiu Zhu, Jun Liu, Yinglu Zhang, Ying Huang, Yi Wang, and Jinsong Xia, "Athermal 4-channel (de-)multiplexer in silicon nitride fabricated at low temperature," Photon. Res. 6, 686-691 (2018).

Liwei Tang, Yu Li, Jiachen Li, Sigang Yang, Hongwei Chen, and Minghua Chen, "Temperature-insensitive Mach-Zehnder interferometer based on a silicon nitride waveguide platform," Opt. Lett. 45, 2780-2783 (2020). [Abstract Only].

Folkert Horst, et. al., "Cascaded Mach-Zehnder wavelength filters in silicon photonics for low loss and flat pass-band WDM (de-)multiplexing," Opt. Express 21, 11652-11658 (2013).

Jonathan Y. Lee, et. al., "Fabrication-Tolerant Nitride Lattice Filter for CWDM," OFC conference, May 6-11, 2021 (accepted). [Abstract Only].

PCT Application PCT/US2021/070258 filed Mar. 10, 2021.
U.S. Appl. No. 17/301,968, filed Apr. 20, 2021.
PCT Application PCT/US2020/052606 filed Sep. 25, 2020.
U.S. Appl. No. 17/187,477, filed Feb. 26, 2021.
PCT Application PCT/US2020/037861 filed Jun. 16, 2020.
U.S. Appl. No. 17/107,298, filed Nov. 30, 2020.

Dajian Liu et al., "Silicon photonic filters," Microwave and Optical Technology Letters, John Wiley & Sons, Inc, US, vol. 63, No. 9, Dated: Jul. 8, 2020, pp. 2252-2268.

Torsten Augustsson, "Proposal of a DMUX with a Fabry-Perot All-Reflection Filter-Based MMIMI Configuration," IEEE Photonics Technology Letters, IEEE, USA, vol. 13, No. 3, Dated: Mar. 1, 2001.

PCT, Notification of Transmittal of The International Search Report and The Written Opinion of The International Searching Authority, or The Declaration for Application PCT/US2022/077258 dated Jan. 25, 2023.

\* cited by examiner

FABRICATION-TOLERANT ON-CHIP MULTIPLEXERS AND DEMULTIPLEXERS

TECHNICAL FIELD

Embodiments presented in this disclosure generally relate to multiplexers and demultiplexers for optical signal processing. More specifically, embodiments disclosed herein provide for greater fabrication tolerances, including temperature insensitivities, via a multi-stage design.

BACKGROUND

As optical signaling grows in use, users are demanding ever higher data throughput rates in ever smaller or more efficient optical signaling devices. One way to provide higher data rates is using wavelength division multiplexing (WDM) to send several different signals at different wavelengths over a shared optical transmission medium. Placing several optical signals onto a shared channel is referred to as multiplexing, while extracting or separating the individual optical signals from the shared channel once multiplexed is referred to as demultiplexing. A device used to multiplex signals together is referred to as a multiplexer or "MUX", while a device used to demultiplex signals apart is referred to as a demultiplexer or "DeMUX". To ensure that the signals can be properly placed onto and retrieved from the shared optical transmission medium, especially as the separation in wavelength between individual signals decreases, the MUXs and DeMUXs are often held to extremely tight manufacturing tolerances, are subject to active tuning (using electrical power), or are bulky.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
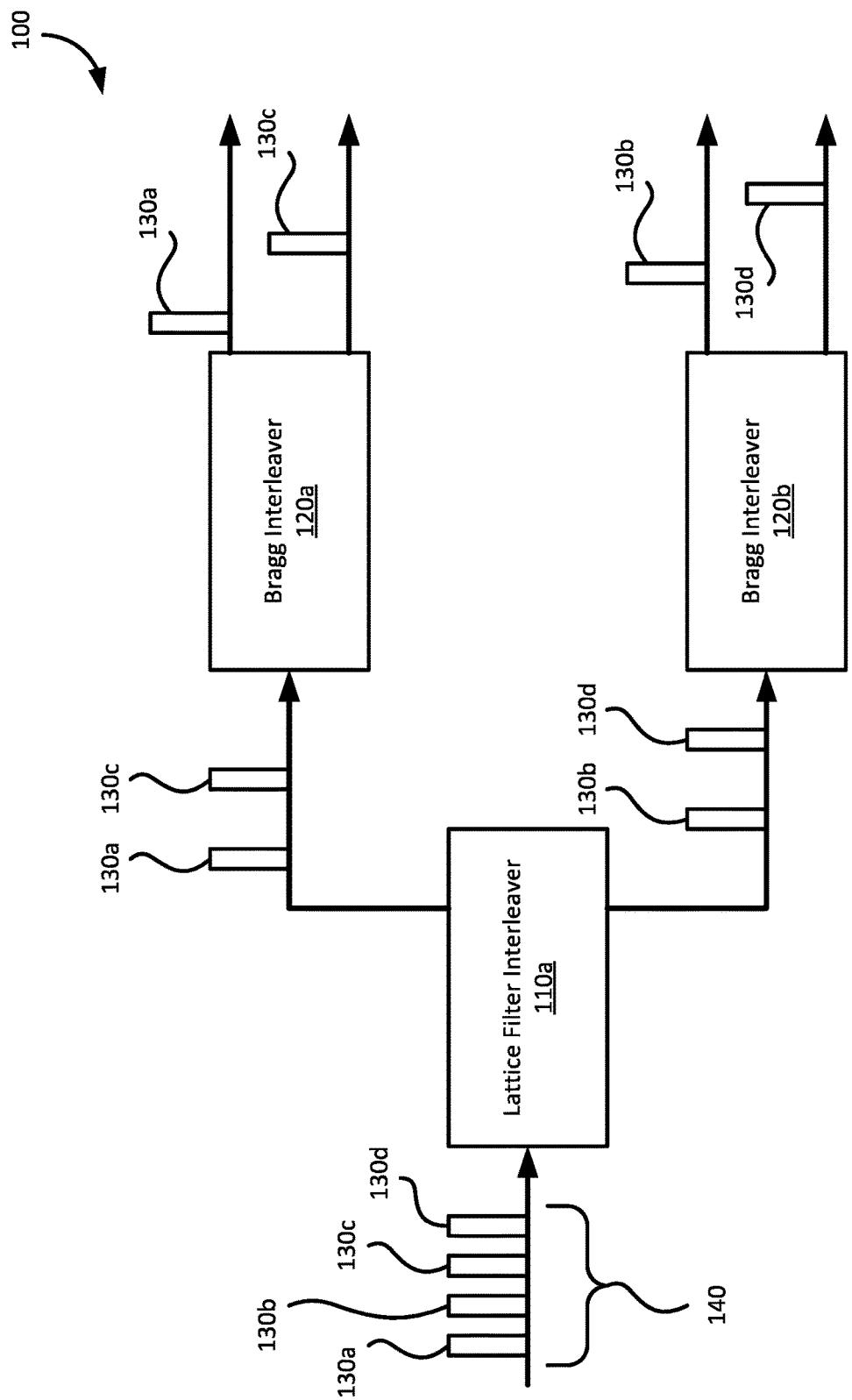
FIGS. 1A and 1B illustrate layouts of a MUX/DeMUX in DeMUX operation, according to embodiments of the present disclosure.

One embodiment presented in this disclosure provides a demultiplexer, comprising: a lattice filter interleaver configured to receive an input signal including a plurality of individual signals and to produce a first interleaved signal with a first subset of the plurality of individual signals and a second interleaved signal with a second subset of the plurality of individual signals; a first Bragg interleaver configured to receive the first interleaved signal and produce a first output signal including a first individual signal of the plurality of individual signals and a second output signal including a second individual signal of the plurality of individual signals; and a second Bragg interleaver configured to receive the second interleaved signal and produce a third output signal including a third individual signal of the plurality of individual signals and a fourth output signal including a fourth individual signal of the plurality of individual signals.

One embodiment presented in this disclosure provides a multiplexer, comprising: a first Bragg interleaver configured to receive a first individual signal of a first wavelength and a second individual signal of a second wavelength and produce a first interleaved signal including the first individual signal and the second individual signal; a second Bragg interleaver configured to receive a third individual signal of a third wavelength and a fourth individual signal of a fourth wavelength and produce a second interleaved signal including the third individual signal and the fourth individual signal, wherein the third wavelength is between the first wavelength and the second wavelength and the fourth wavelength is greater than the first wavelength and the second wavelength; and a lattice filter interleaver configured to receive the first interleaved signal and the second interleaved signal to produce a multiplexed output signal including the first individual signal, the second individual signal, the third individual signal, and the fourth individual signal.

One embodiment presented in this disclosure provides a device, comprising: a lattice filter interleaver connected on a first side to a multiplexed signal port and connected on a second side to: a first Bragg interleaver that is connected to a first individual signal port and a second individual signal port; and a second Bragg interleaver connected to a third individual signal port and a fourth individual signal port.

EXAMPLE EMBODIMENTS

The present disclosure provides a design for multiplexers (MUX) and demultiplexers (DeMUX) on an integrated silicon photonic platform for various optoelectronic applications. The device uses a two-stage design using optical lattice filters (LF) in one stage, and Bragg gratings in the other stage. The design provides a compact and fully passive solution (e.g., not using external electrical power during operation) that is compatible with Complementary Metal Oxide Semiconductor (CMOS) fabrication processes.

The LFs in the first stage split the input signal into interleaved signals to multiple Bragg gratings in the second stage, with wide bandwidth spacing between the split signals, thus giving greater tolerance for the Bragg gratings to distinguish the signals. Although referred to generally as "signals" or "optical signals" in the present disclosure, the signal may include a single wavelength or multiple wavelengths within a wavelength band. When operated as a MUX, the devices described herein interleave individual wavelengths within a designated wavelength bands. Similarly, when operated as a DEMUX, the devices described herein de-interleave individual wavelengths within a designated wavelength bands. Depending on the standard used by the device, the wavelengths of the single wavelength signals are specified at known positions within the wavelength band. Accordingly, the wavelength bands and the pitch between the individual wavelengths for the single wavelength signals fixed), but the individual signals might not be located on a fixed wavelength pitch.

In various embodiments, the LFs include Mach-Zehnder Interferometer (MZI) lattice filters, made up of several broadband tap couplers (Btap) with different phase delay lines disposed between one another. By designing the width, length, and material composition of the delay lines to reduce the effect of fabrication process variations, the overall design can minimize spectral shift in operation, further providing for proper spacing of the output signals and the ability of the components to distinguish between the multiplexed signals.

Figure 1B:
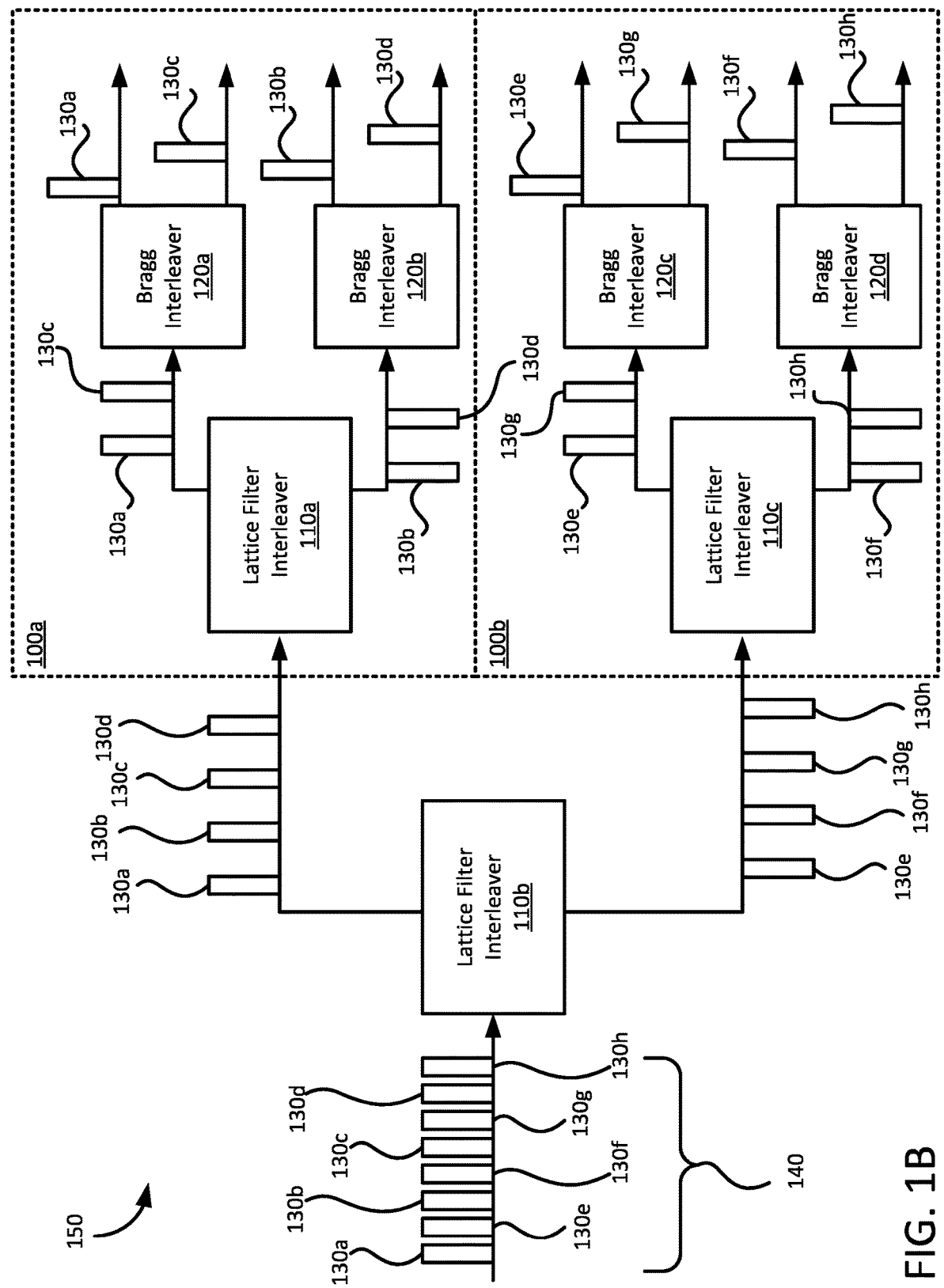

FIGS. 1A and 1B illustrate layouts of a MUX/DeMUX 100 in DeMUX operation, according to embodiments of the present disclosure. Although examples given in the present disclosure are primarily given in relation to DeMUX operations, one of skill in the art will appreciate that the described devices may work in one direction as a MUX and in the opposite direction as a DeMUX. Stated differently, the direction of the light path through the described hardware defines whether a given device operates as a MUX or as a DeMUX, and the operation as a DeMUX can be understood mutatis mutandis to describe the operation as a MUX for the described hardware. Accordingly, examples given with reference to a multiplexed signal moving from left to right in the example figures in which the individual signals are split apart from one another (e.g., demultiplexing operation) can be understood in the reverse; where multiple individual signals move from right to left in the example figures to combine into a single multiplexed signal (e.g., multiplexing operation).

The MUX/DeMUX 100 includes a first lattice filter interleaver 110a (generally or collectively, lattice filter interleaver 110) that receives a plurality of individual signals 130a-d (generally or collectively, individual signals 130) that are carried in a multiplexed signal 140 to be divided onto separate transmission media for each individual signal 130.

In each of FIGS. 1A and 1B, one or more lattice filter interleavers 110 are provided as a first stage to separate adjacent individual signals 130 on a multiplexed signal 140 from one another. For example, a second individual signal 130b is adjacent to a first individual signal 130a and a third individual signal 130c, and a fourth individual signal 130d is adjacent to the third individual signal 130d within the multiplexed signal 140. The first lattice filter interleaver 110a therefore outputs the second individual signal 130b and the fourth individual signal 130d on a different output path from the first individual signal 130a and the third individual signal 130c; demultiplexing the multiplexed signal 140 into two interleaved signals.

In various embodiments, such as in FIG. 1A, the first lattice filter interleaver 110a receives a Coarse Wavelength Division Multiplexed (CWDM) multiplexed signal 140 with four signals 130a-d with wavelengths nominally separated by, e.g., 20 nanometers (nm) from one another. In other embodiments, such as in FIG. 1B, the first lattice filter 110a receives a half of the signals 130a-d of a partially processed CWDM multiplexed signal 140 with eight signals 130a-h with wavelengths nominally separated by 20 nm from one another that a second lattice filter 110b splits into a first subset for further demultiplexing by the first lattice filter interleaver 110a and a second subset for further demultiplexing by a third lattice filter interleaver 110c. Stated differently, the second lattice filter 110b receives an origin signal with eight signals 130a-h multiplexed thereon, provides a first output signal with four signals 130a-d multiplexed thereon to the first lattice filter interleaver 110a, and provides a second output signal with four signals 130e-h multiplexed thereon to the third lattice filter interleaver 110c. Although generally described in relation to CWDM with nominal wavelength spacing of 20 nm, the present disclosure may be applied in multiplexing/demultiplexing scenarios using different nominal wavelength spacing values and numbers of individual signals 130 included in the respective multiplexed signals 140.

Accordingly, each lattice filter interleaver 110 receives a set in individual signals 130 and divides the set into two parts; referred to generally as the "even" signals and the "odd" signals. Each lattice filter interleaver 110 effectively doubles the spacing between the individual signals 130 for the next stage of the MUX/DeMUX 100. For example, the second lattice filter interleaver 110b in FIG. 1B that receives a multiplexed signal 140 with individual signals 130 with wavelengths spaced 10 nm apart, provides outputs to the first lattice filter interleaver 110a and the third lattice filter interleaver 110c with the wavelengths of the individual signals spaced 20 nm apart. In turn, as shown in FIGS. 1A and 1B, the first lattice filter interleaver 110a provides outputs to the first Bragg interleaver 120a (generally or collectively, Bragg interleaver 120) and the second Bragg interleaver 120b spaced 40 nm apart. Similarly, the third lattice filter interleaver 110c provides outputs to the third Bragg interleaver 120c and the fourth Bragg interleaver 120d spaced 40 nm apart.

The Bragg interleavers 120, similarly to the lattice filter interleavers 110, receive a set in individual signals 130 and divides the set into an "even" signal and an "odd" signal on separate transmission media. For example, the first Bragg interleaver 120a receives a first interleaved signal from the first lattice filter interleaver 110a that includes the first individual signal 130a and the third individual signal 130c, and outputs the first individual signal 130a and the third individual signal 130c on separate transmission media (or ports) for separate and individual processing. Similarly, the second Bragg interleaver 120b receives a second interleaved signal from the first lattice filter interleaver 110a that includes the second individual signal 130b and the fourth individual signal 130d, and outputs the second individual signal 130b and the fourth individual signal 130d on separate transmission media (or ports) for separate and individual processing.

Although the lattice filter interleavers 110 and the Bragg interleavers 120 perform similar functions (e.g., demultiplexing signals into even/odd sets or multiplexing individual signals 130 into an interleaved signal) as one another, the underlying hardware of the interleavers are different. The hardware and construction of the lattice filter interleavers 110 is described in greater detail in regard to FIGS. 2A-2B, 3, 4, 5A-5B, and 6A-6B, and the hardware and construction of the Bragg interleavers 120 is discussed in greater detail in regard to FIGS. 7A-7D.

The different hardware components used in the described MUX/DeMUX 100 provides a hybrid design approach that offers the overall MUX/DeMUX 100 with greater tolerance to variations in the fabrication process and variations in temperature during operation and with improved resilience to cross-talk and deviations from nominal signal spacing than designs using just one of lattice filter interleavers 110 or Bragg interleavers 120. Because Bragg gratings (e.g., included in the Bragg interleavers 120) can be more sensitive to variations in the thickness of the underlying material used in the waveguides (e.g., Silicon Nitride (SiN)) compared to lattice filters (e.g., included in the lattice filter interleavers 110), but provide greater resilience to cross-talk between individual signals 130 than lattice filters, the hybrid design offers the benefits of both hardware configurations while minimizing the downsides of the individual configurations.

Figure 2A:
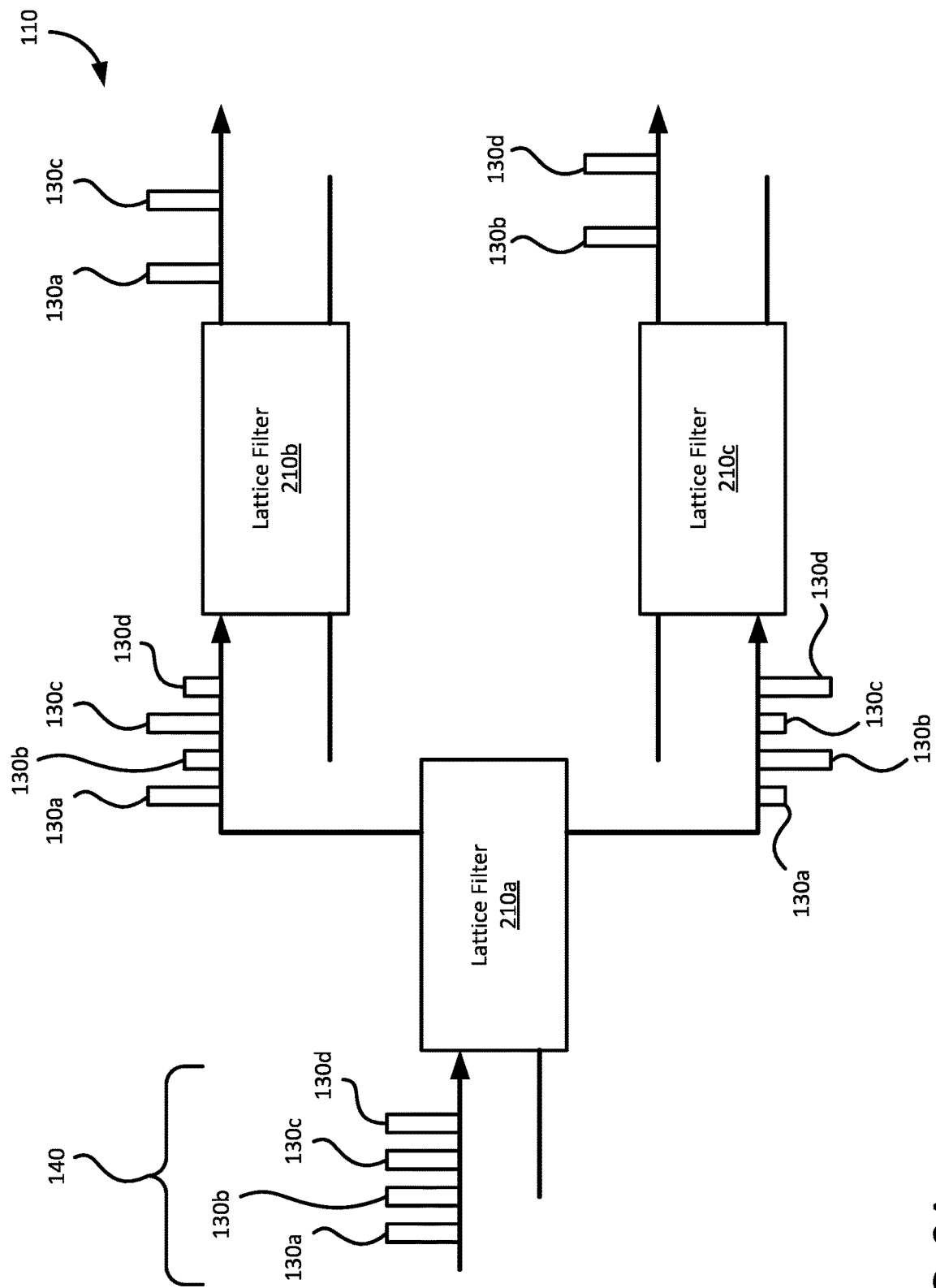
FIGS. 2A and 2B illustrate operations of individual lattice filters within a lattice filter interleaver, according to embodiments of the present disclosure.
Figure 2B:
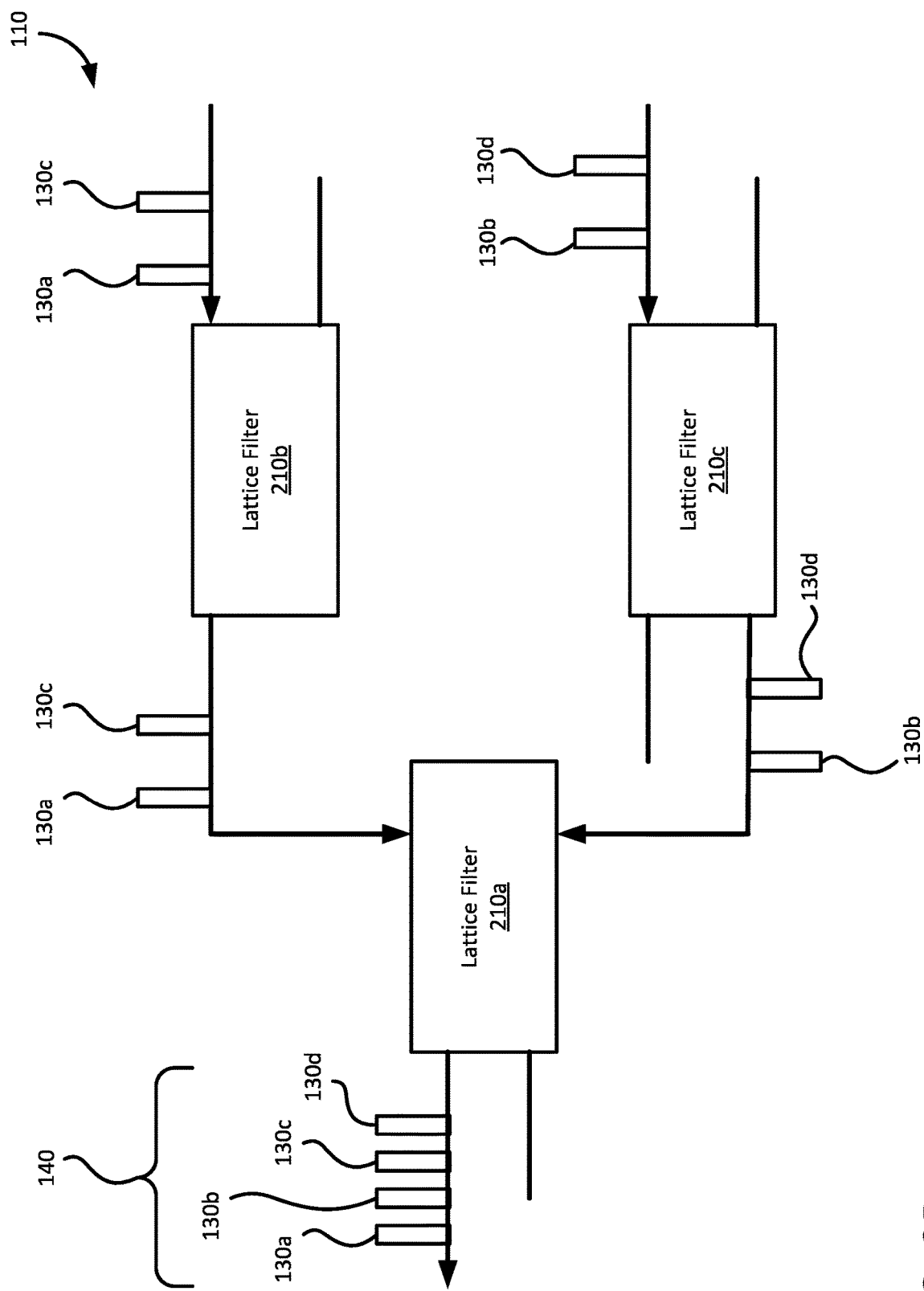

FIGS. 2A and 2B illustrate operations of individual lattice filters 210a-c (generally or collectively, lattice filter 210) within a lattice filter interleaver 110, according to embodiments of the present disclosure.

FIG. 2A illustrates operation of the lattice filter interleaver 110 in demultiplexing mode. When operated in demultiplexing mode, the lattice filter interleaver 110 receives a multiplexed signal 140 and output two sets of interleaved signals that each include half of the individual signals 130 included in the multiplexed signal 140. For example, when receiving a multiplexed signal 140 including four individual signals 130a-d at a first port of a first lattice filter 210a, a second lattice filter 210b outputs an interleaved signal including the first individual signal 130a and the third individual signal 130c (excluding the second individual signal 130b and the fourth individual signals 130d). Similarly, a third lattice filter 210c outputs an interleaved signal including the second individual signal 130b and the fourth individual signal 130d (excluding the first individual signal 130a and the third individual signals 130c).

In various embodiments, the first lattice filter 210a extinguishes the second individual signal 130b and the fourth individual signal 130d to various extents (e.g., -X decibels (dB)) on the first interleaved signal provided to the second lattice filter 210b. Similarly, the first lattice filter 210a extinguishes the first individual signal 130a and the third individual signal 130c to various extents (e.g., -X dB) on the second interleaved signal provided to the third lattice filter 210c. Accordingly, in some embodiments, the second lattice filter 210b and the third lattice filter 210c may further extinguish the undesired individual signals 130 (e.g., an additional -Y dB) to ensure the undesired individual signals are received by the respective Bragg interleavers 120 below a threshold amplitude. In other embodiments, when the first lattice filter 210a provides the undesired individual signals 130 to each of the second lattice filter 210b and the third lattice filter 210c already below the threshold amplitude, the second lattice filter 210b and the third lattice filter may provide additional filtering and signal shaping for the desired individual signals 130.

FIG. 2B illustrates operation of the lattice filter interleaver 110 in multiplexing mode. When operated in multiplexing mode, the lattice filter interleaver 110 receives two interleaved signals that each include half of the individual signals 130 to multiplex together, and outputs one multiplexed signal 140 that includes the individual signals 130. For example, a second lattice filter 210b receives an input signal (e.g., from a Bragg interleaver 120 or an upstream lattice filter interleaver 110) that includes the first individual signal 130a and the third individual signal 130c, while the third lattice filter 210c receives an input signal (e.g., from a different Bragg interleaver 120 or upstream lattice filter interleaver 110) that includes the second individual signal 130b and the fourth individual signal 130d. The first lattice filter 210a receives the interleaved signals from the second lattice filter 210b and the third lattice filter 210c, and multiplexes the two inputs to produce one multiplexed signal 140 that includes the provided individual signals 130.

Figure 3:
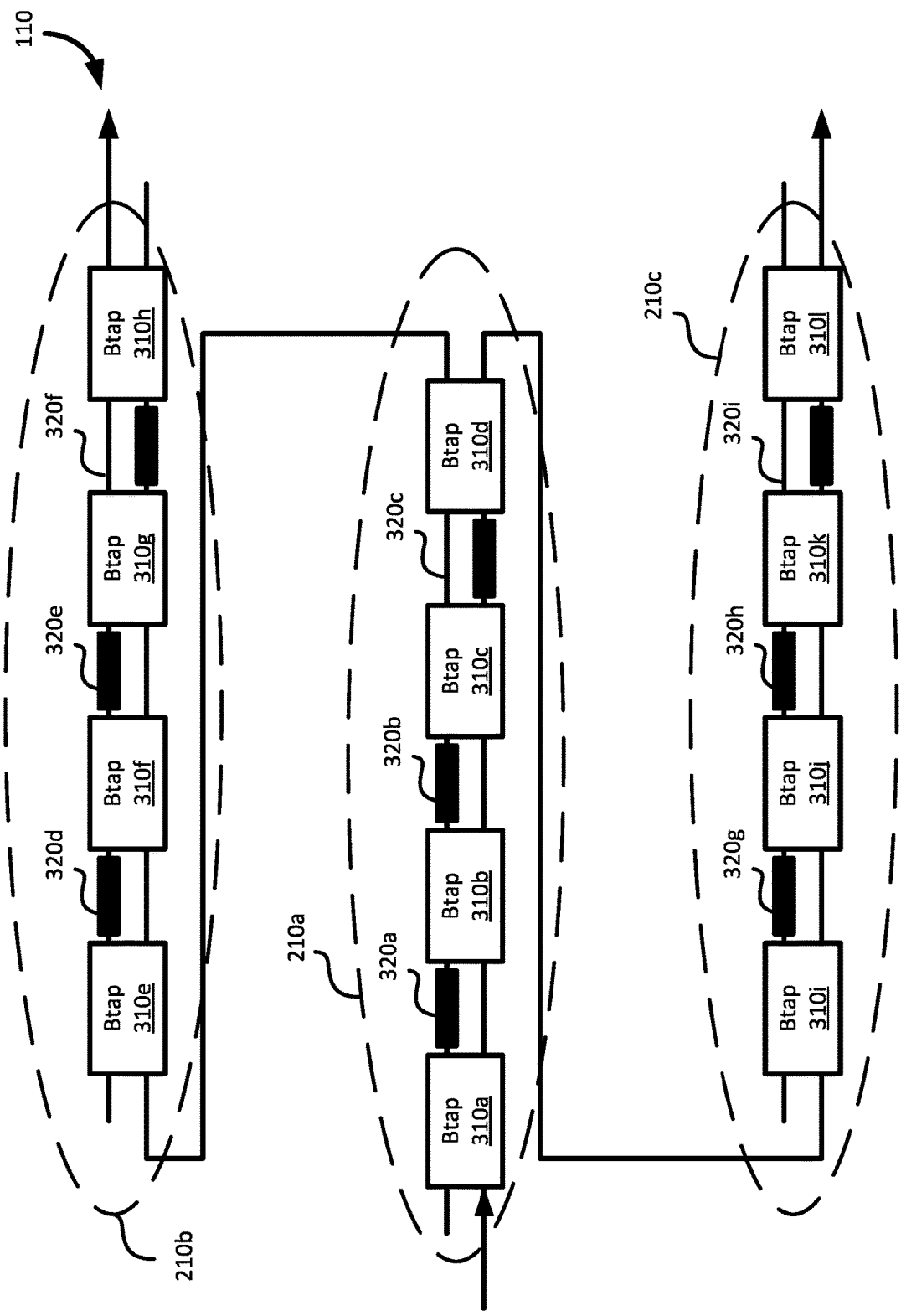
FIG. 3 illustrates a construction of the individual lattice filters in a lattice filter interleaver, according to embodiments of the present disclosure.

FIG. 3 illustrates a construction of the individual lattice filters 210 in a lattice filter interleaver 110, according to embodiments of the present disclosure. Each lattice filter 210 includes a series of broadband tap (btap) couplers 310a-l (generally or collectively, btap couplers 310) that are adiabatic couplers. A btap coupler 310 is an optical device that can be used in a fiber optic communication system intended for high bandwidth usage, and as such may operate over a broad range of signal wavelengths. Accordingly, each btap coupler 310 in the MUX/DeMUX 100 may be constructed with the same nominal characteristics to cover the bandwidth of the multiplexed signal 140, despite (potentially) operating on a subset of the individual signals 130 depending on where a given btap coupler 310 is located in the optical path of the MUX/DeMUX 100. By using a uniform design for the btap couplers 310, a fabricator may simplify design and fabrication of the MUX/DeMUX 100 and provide for signal conditioning in the wavelengths between the individual signals 130.

Each btap coupler 310 included in a given lattice filter 210 is linked to the next btap coupler 310 in that lattice filter 210 via a pair of phase delay lines 320a-l (generally or collectively, phase delay line pairs 320 or pair of phase delay lines). The btap couplers included in different lattice filters 210 that are linked (e.g., the fourth btap coupler 310d with the fifth btap coupler 310e and the ninth btap coupler 310i) are linked via a single waveguide (e.g., not a pair with different delay characteristics).

The delay lines 320 induce phase delays to the signals carried between subsequent btap couplers 310 within a given lattice filter 210, which allow the signals to constructively or destructively interfere with one another to extinguish some of the individual signals 130. Accordingly, the first lattice filter 210a may receive a multiplexed signal 140 including X individual signals 130 and each of the second lattice filter 210b and the third lattice filter 210c output X/2 individual signals. The signals output by the second lattice filter 210b and the third lattice filter 210c are interleaved with one another so that the individual signals 130 included in each output signal have twice the separation in bandwidth between one another compared to the input signal received by the first lattice filter 210a.

In various embodiments, each initial pair of phase delay lines 320 in the respective lattice filter 210 (e.g., the first delay lines 320a, the fourth delay lines 320d, and the seventh delay lines 320g) induce a phase delay using a different length in each arm of the delay lines 320 (e.g., $\Delta L$ between the arms; $L_1-L_2=\Delta L$). The intermediate pair of phase delay lines 320 in the respective lattice filter 210 (e.g., the second delay lines 320b, the fifth delay lines 320e, and the eighth delay lines 320h) also induce a phase difference of using a different length in each of the arms of the delay lines 320 (e.g. for a total offset of $2\Delta L$ if both pairs use the same $\Delta L$). The final pair of phase delay lines 320 in the respective lattice filter 210 (e.g., the third delay lines 320c, the sixth delay lines 320f, and the ninth delay lines 320i) induce a phase difference on an opposite arm of from the initial and intermediate pairs of delay lines using a length equal to the total length used by the other phase delay lines 320, plus additional length for $\pi$ radians of phase shift in the carried signals (e.g., $2\Delta L+\pi$ for a total offset of $\pi$ radians). By using different lengths in the delay lines 320, the lattice filters 210 may be used as passive devices (e.g., requiring no additional power to induce a phase shift). In various embodiments, different offsets than those given in the above example may be used in the various pairs of phase delays lines 320.

In various embodiments, the tap strengths (k) used in the various lattice filters 210 have the same configuration for the first lattice filter 210a, the second lattice filter 210b, and the third lattice filter 210c. For example, the tap strengths may be set as laid out in Table 1, where $k_1$ corresponds to the tap strength of the first btap coupler 310a, $k_2$ corresponds to the tap strength of the second btap coupler 310b, etc., so that the tap strengths are set to be equivalent to one another across the lattice filters 210. As will be appreciated, due to manufacturing tolerances, the actual tap strengths may vary from the nominal values (e.g., by ±5%) while still being set to equivalent values across the corresponding btaps couplers 310 in each lattice filter 210.

TABLE 1

| $k_1 = 0.50$ | $k_2 = 0.80$ | $k_3 = 0.80$ | $k_4 = 0.95$ |
|---|---|---|---|
| $k_5 = 0.50$ | $k_6 = 0.80$ | $k_7 = 0.80$ | $k_8 = 0.95$ |
| $k_9 = 0.50$ | $k_{10} = 0.80$ | $k_{11} = 0.80$ | $k_{12} = 0.95$ |

In other embodiments, the second lattice filter 210b and the third lattice filter 210c use the same tap strengths as one another, but different tap strengths from the first lattice filter 210a. Using different configurations of tap strengths between the first lattice filter 210a and the other lattice filters 210b-c can improve the roll-off for selective signal filtering, while maintaining low crosstalk between the signals (e.g., less than −25 dB). For example, the tap strengths may be set as laid out in Table 2, where $k_1$ corresponds to the tap strength of the first btap coupler 310a, $k_2$ corresponds to the tap strength of the second btap coupler 310b, etc.

TABLE 2

| $k_1 = 0.50$ | $k_2 = 0.80$ | $k_3 = 0.80$ | $k_4 = 0.95$ |
|---|---|---|---|
| $k_5 = 0.50$ | $k_6 = 0.40$ | $k_7 = 0.90$ | $k_8 = 0.95$ |
| $k_9 = 0.50$ | $k_{10} = 0.40$ | $k_{11} = 0.90$ | $k_{12} = 0.95$ |

Although generally discussed in relation to a signal flow moving from the first lattice filter 210a to the second lattice filter 210b and the third lattice filter 210c for DEMUX operation, lattice filter interleavers 110 may operate in the opposite direction when used in MUX operation. Accordingly, the arms described as input arms in a DEMUX arrangement may be understood as output arms in a MUX arrangement, and vice versa. For example, in DEMUX operation, the second btap 310b receives phase delayed signals from the first phase delay line pair 320a (via input arms) and transmits output on the second phase delay line pair 320b (via output arms). However, in MUX operation, the second btap 310b receives phase delayed signals from the second phase delay line pair 320b (via input arms) and transmits output on the first phase delay line pair 320a (via output arms).

Figure 4:
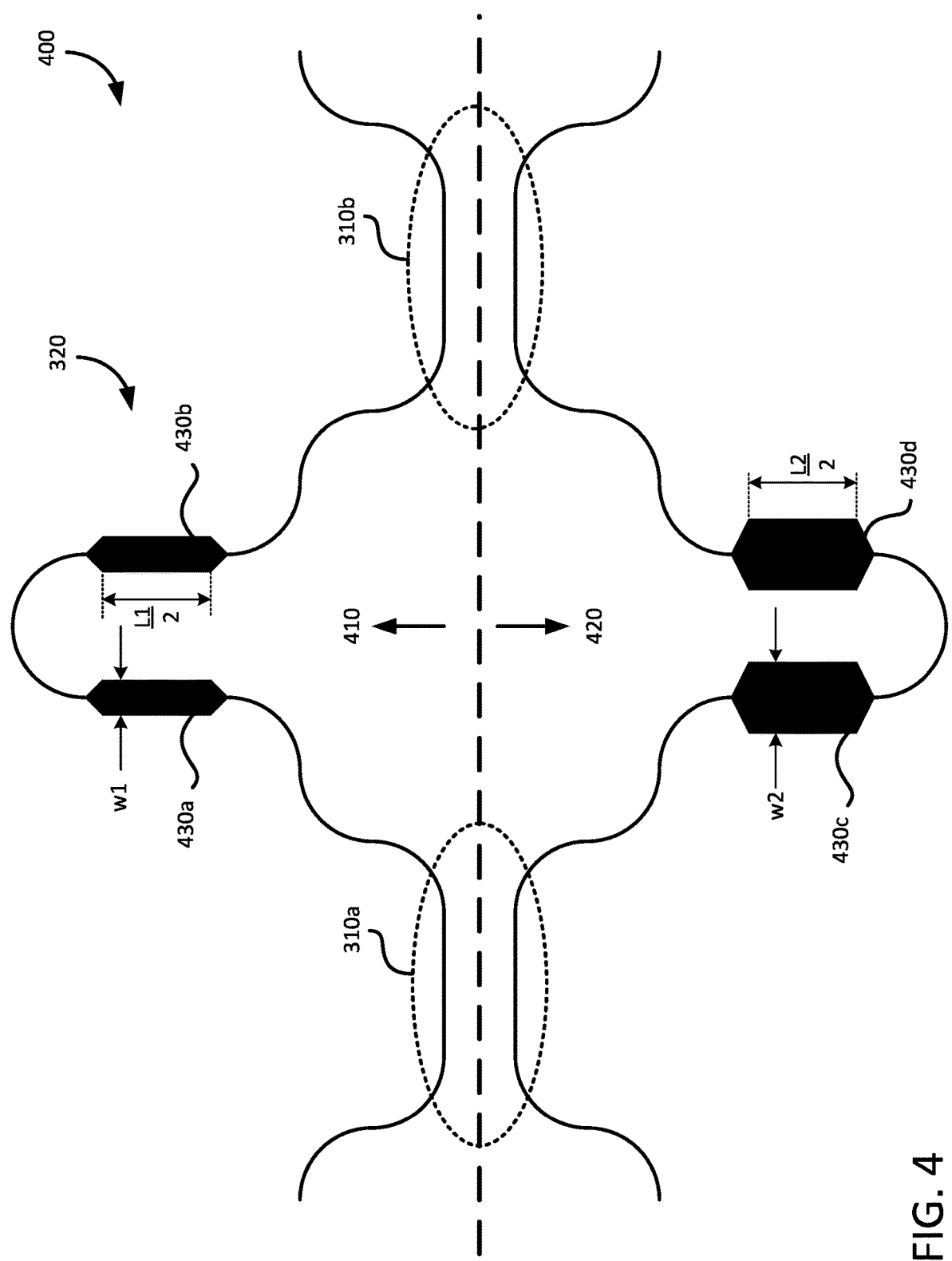
FIG. 4 illustrates a details of a Mach-Zehnder Interferometer, according to embodiments of the present disclosure.

FIG. 4 illustrates an MZI 400 defined by a first btap coupler 310a and a second btap coupler 310b with the intervening delay lines 320, according to embodiments of the present disclosure. The phase delay line pairs 320 linking the first btap coupler 310a and the second btap coupler 310b are divided into a first leg 410 and a second leg 420. To change the relative phases of signals carried in each of the legs, the phase delay line pairs 320 are constructed to include delay elements 430a-d (generally or collectively delay element 430) with one or more of a different length (L) or width (w) between opposing legs. For example, the first leg 410 has delay elements 430a-b with a width of $w_1$ and a total length of $L_1$ (e.g., $L_1/2$ in each delay element 430), whereas the second leg 420 has delay elements 430c-d with a width of $w_2$ and a total length of $L_2$ (e.g., $L_2/2$ in each delay element 430)

The variations in fabrication process affecting the thickness of the waveguide material layer can result in spectral shift ($\Delta\lambda$) that moves the individual signals 130 away from nominal wavelengths and potentially clustering adjacent individual signals 130 closer to one another or further from one another than intended, thus resulting in cross-talk or malformed signals lower ability for distinguishing between the individual signals 130. The lattice filters 210 are therefore designed to guard against spectral shift when multiplexing or demultiplexing by configuring various aspects of the btap couplers 310 and delay lines 320 to have specific widths and lengths according to the materials used and the wavelengths to be carried in response to the known dominant factor(s) in manufacturing process variations. This proactive design process provides greater resilience in the lattice filter 210 to the process variations expected to occur in fabricating the described MUX/DeMUX 100.

For example, when the process variations are dominated by variations in width and thickness, the spectral shift ($\Delta\lambda$) for an original wavelength $\lambda_0$ may be expressed according to Formula 1, where $\Delta w$ is the change in width, $\Delta h$ is the change in thickness, and $\Delta T$ is the change in temperature. Additionally, $n_{g1}$ and $n_{g2}$ are the group indices of the first leg 410 and the second leg 420 of the phase delay line pairs 320, respectively; $n_1$ and $n_2$ are the effective indices of the first leg 410 and the second leg 420, respectively; and $L_1$ and $L_2$ are the lengths of the first leg 410 and the second leg 420, respectively.

$$\Delta\lambda = \frac{\lambda_0}{n_{g1}L_1 - n_gL_2} * \left(\Delta h\left(\frac{dn_1}{dh}L_1 - \frac{dn_3}{dh}L_2\right) + \Delta w\left(\frac{dn_1}{dw}L_1 - \frac{dn_3}{dw}L_2\right) + \Delta T\left(\frac{dn_1}{dT}L_1 - \frac{dn_3}{d}L_2\right)\right) \quad \text{Formula 1}$$

The Free Spectral Range (FSR) of the design can similarly be understood according to Formula 2.

$$FSR = \frac{\lambda_0}{n_{g1}L_1 - n_gL_2} \quad \text{Formula 2}$$

By choosing a waveguide material with a lower thermo-optic coefficient (TOC), such as SiN, a fabricator can reduce the effect of changes in temperature $\Delta T$ on spectral shift ($\Delta\lambda$) compared to materials with relatively higher TOCs, (e.g., Si).

Similarly, by using different widths in the different legs of the phase delay elements 430 of each leg, a fabricator can use shorter lengths in the corresponding phase delay elements 430 to create the same phase offset (relative to phase delay elements 430 that use the same widths), and thus reduce the effect of changes in width $\Delta w$ on unintended spectral shift ($\Delta\lambda$) compared designs using longer or different lengths of delay lines 320 to create phase differences.

As used herein, the thickness of the waveguide measures the "height" of the illustrated components projecting into or out of the page. In a layered deposition fabrication process, the nominal thickness of the waveguide may vary, resulting in regions with greater or lesser thicknesses than the nominal thickness. Because waveguide thickness is expected to vary gradually over the surface of the chip, components that are located closer together are expected to observe more similar thickness values, and thus result in lower spectral shift (Δλ) than devices that include components spread over a greater area (and are thus subject to greater potential variation in thickness). The effect of changes in thickness of the waveguides can be minimized by various design choices, such as using smaller footprints and clustering various devices together. Several layouts for reducing the footprint of the MUX/DeMUX 100 are discussed in greater detail in regard to FIGS. 5A-5B and 6A-6B.

Accordingly, the present MUX/DeMUX 100 can reduce spectral variation using one or more techniques or design choices to minimize the effects of width, temperature, and thickness on spectral shift.

Figure 5A:
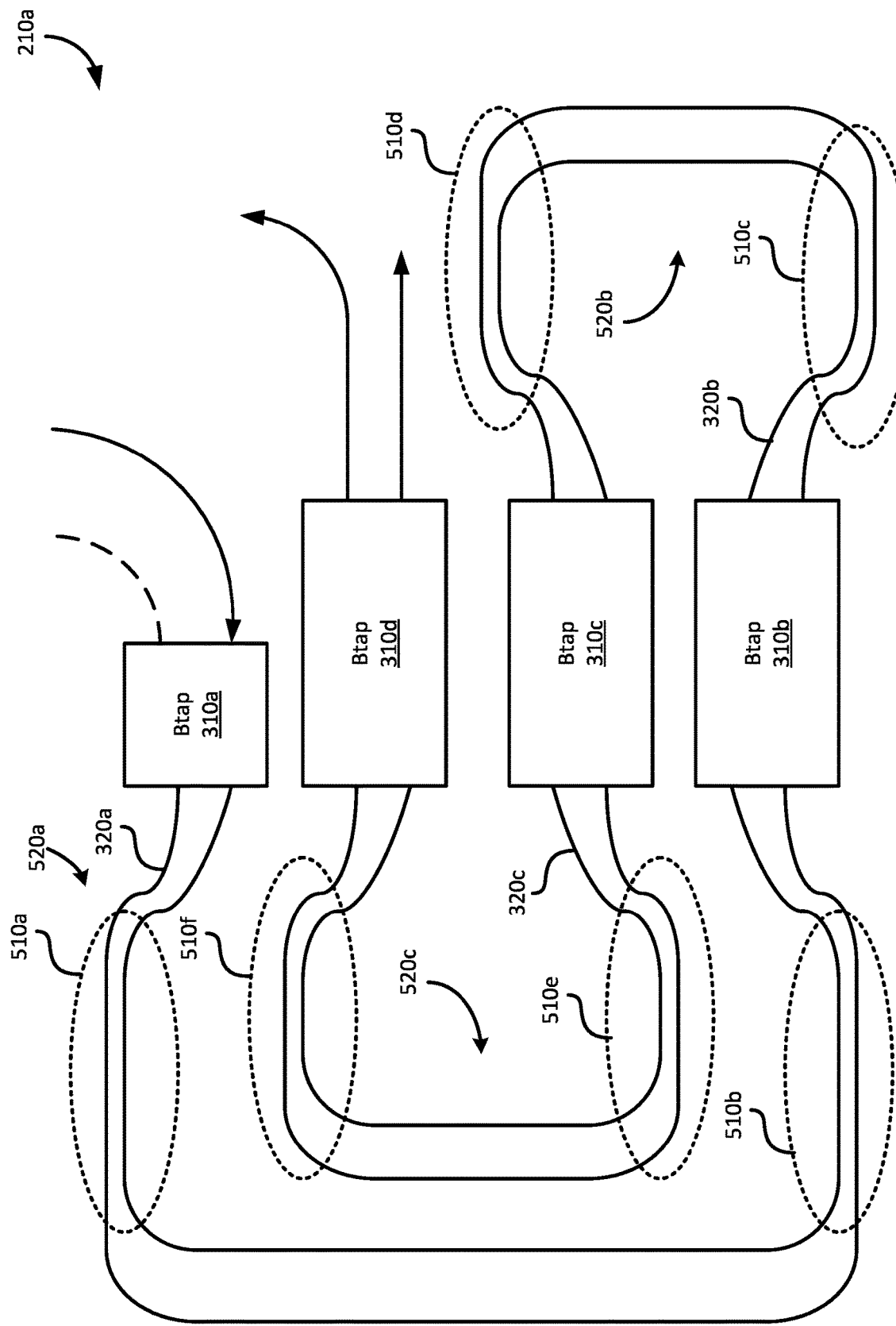
FIGS. 5A-5B illustrate on-chip pathing for an individual lattice filter, according to embodiments of the present disclosure.
Figure 5B:
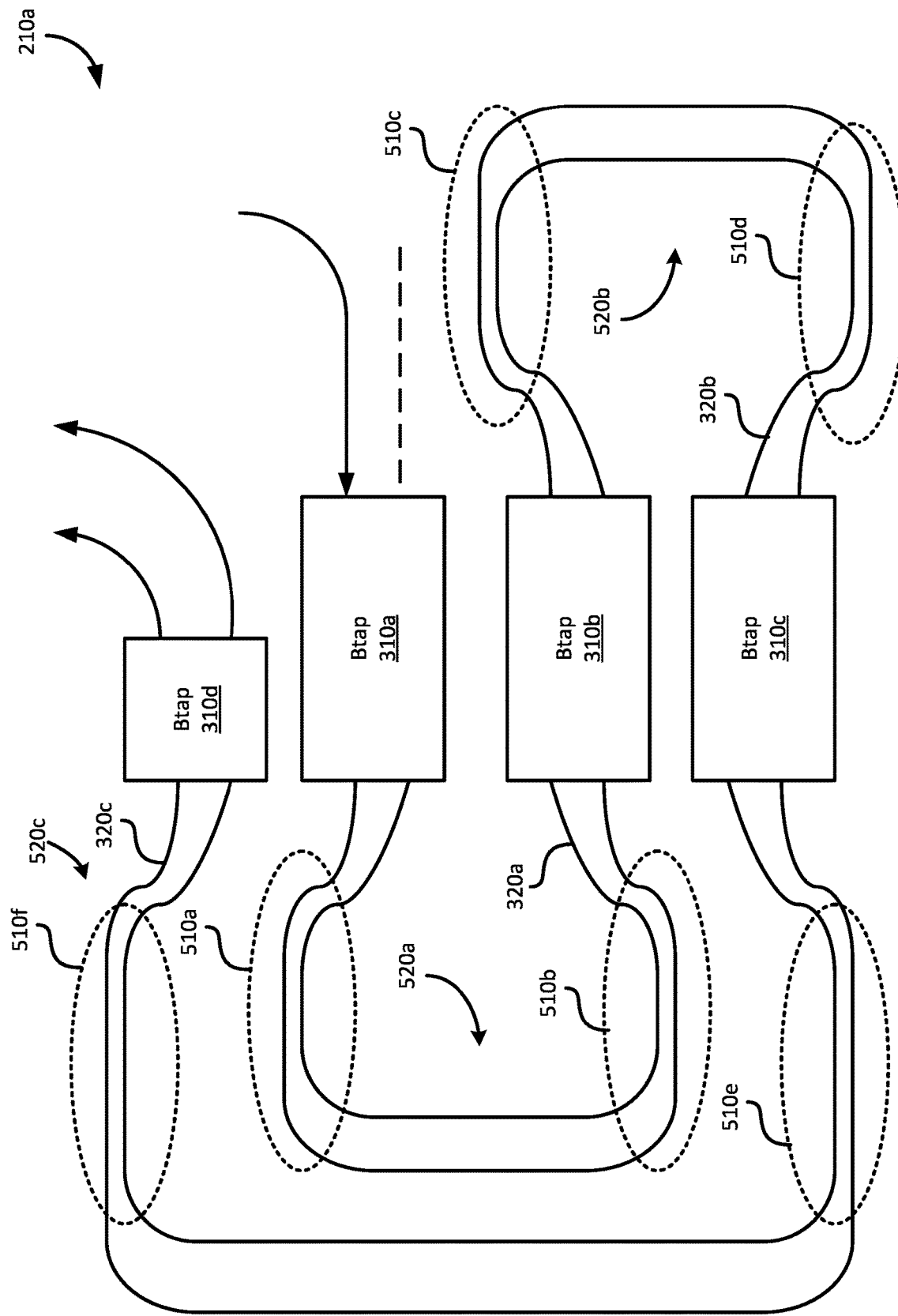

FIGS. 5A and 5B illustrate on-chip pathing for an individual lattice filter 210, according to embodiments of the present disclosure. To reduce the spatial process variations on the lattice filters 210, the footprint of the hardware components is kept compact so that localized variations equally affect all of the hardware components. Each of the optical paths are routed in the same direction from an original btap coupler 310 to a destination btap coupler 310 to allow the delay lines to lay in close proximity to one another, but with sufficient separation to avoid optical coupling between two paths. Accordingly, various approach regions 510a-f (generally or collectively, approach regions 510) may include regions where the delay lines are placed between X and Y nm of each other (e.g., according to a spacing range threshold) to reduce the effect of regionalized thickness variations on the lattice filters 210 while reducing the likelihood of cross-coupling.

To further reduce the overall footprint of the lattice filter 210, the on-chip pathing uses a series of loops 520a-c (generally or collectively, loop 520) for the delay lines 320 to link the btaps 310 together.

As shown in FIG. 5A, the first delay lines 320a form a first loop 520a that projects from one side of the first btap coupler 310a to connect to the second btap coupler 310b on the first side. The third delay lines 320c also project from the first side of third btap coupler 310c and the fourth btap coupler 310d to form a third loop 520c that is encompassed by the first loop 520a. The second delay lines 320b form a second loop 520b that projects from the opposite side of the second btap coupler 310b and the third btap coupler 310c (relative to the first loop 520a and the third loop 520c) to connect to the second btap coupler 310b to the third btap coupler 310c.

As shown in FIG. 5B, the first delay lines 320a form a first loop 520a that projects from one side of the first btap coupler 310a to connect to the second btap coupler 310b on the first side. The third delay lines 320c also project from the first side of third btap coupler 310c and the fourth btap coupler 310d to form a third loop 520c that encompasses the first loop 520a. The second delay lines 320b form a second loop 520b that projects from the opposite side of the second btap coupler 310b and the third btap coupler 310c (relative to the first loop 520a and the third loop 520c) to connect to the second btap coupler 310b to the third btap coupler 310c.

The inputs and outputs of the first btap coupler 310a and the fourth btap coupler 310d are shown on the same side as the second loop 520b projects from the second btap coupler 310b and the third btap coupler 310c with the signal directions indicated from demultiplexing operation.

Although described with inputs and outputs for use in demultiplexing operation, the on-chip layouts shown in FIGS. 5A and 5B may additionally or alternatively be used in multiplexing operation. Accordingly, the first btap coupler 310a, as the input for the demultiplexer (and output for the multiplexer) may include one leg that is unconnected to an input source (or output destination). The fourth btap coupler 310d, as the output for the demultiplexer (and the input for the multiplexer) is connected to two destinations (or two sources), which may include other lattice filter interleavers 110 or Bragg interleavers 120.

Figure 6A:
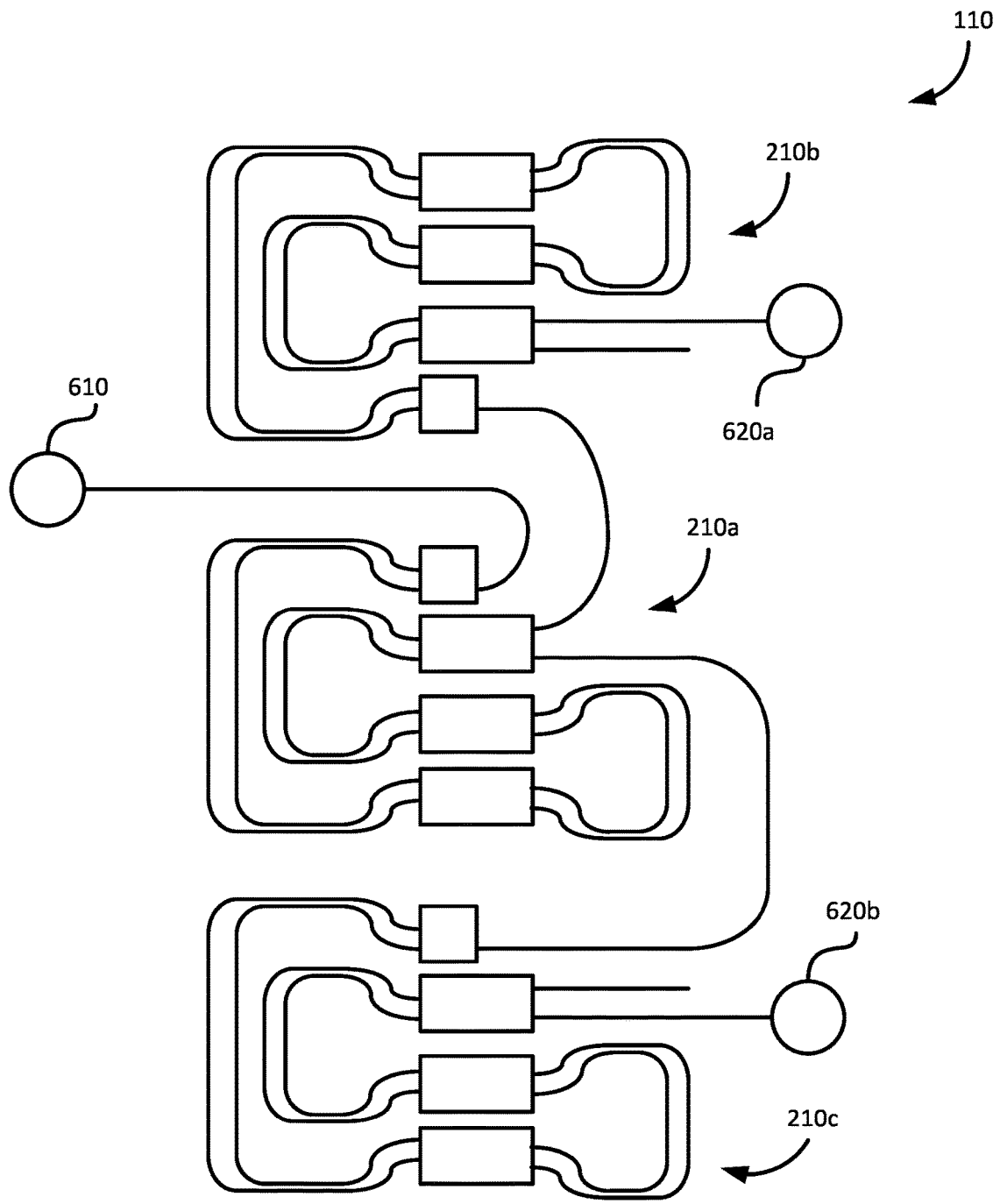
FIGS. 6A-6B illustrate on-chip pathing for a lattice filter interleaver, according to embodiments of the present disclosure.
Figure 6B:
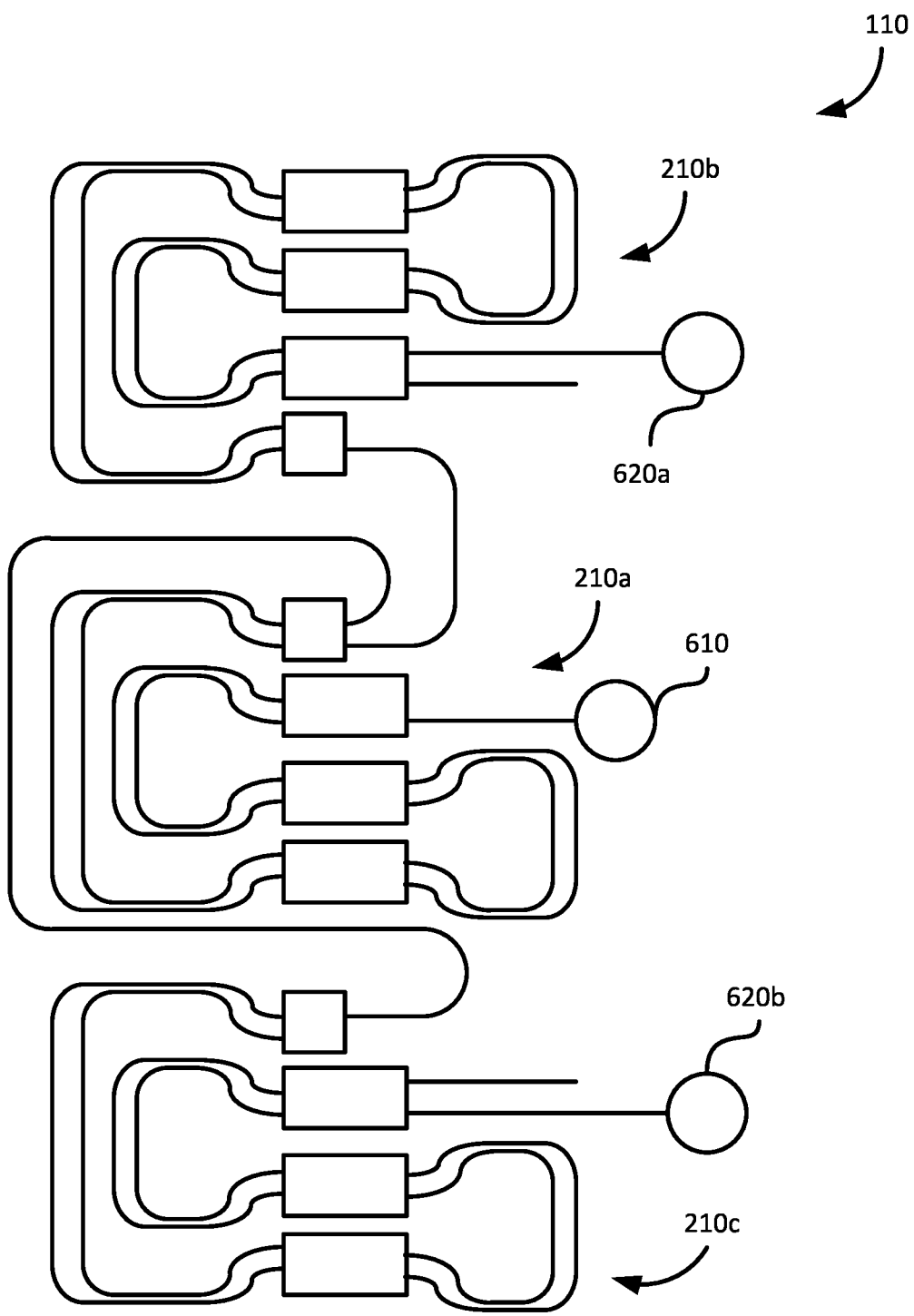

FIGS. 6A and 6B illustrates on-chip pathing for a lattice filter interleaver 110, according to embodiments of the present disclosure. Similarly to the routing of the delay lines in the individual lattice filters 210 shown in FIGS. 5A and 5B, a fabricator can reduce the spatial process variations in the overall lattice filter interleaver 110 by positioning the several component lattice filters 210 closer to one another. FIGS. 6A and 6B therefore show layouts of the components that allow for close proximity of the lattice filters 210, which may reduce the potential variations in waveguide thickness compared to layouts with greater spacing between the components.

As is shown in FIGS. 6A and 6B, the first lattice filter 210a is located centrally to the second lattice filter 210b and the third lattice filter 210c. To help reduce the overall footprint of the lattice filter interleaver 110, the second lattice filter 210b is constructed with a reverse orientation of input/output btaps 310 compared to the first lattice filter 210a and the third lattice filter 210c, thus allowing for shorter inter-filter routing and a tighter overall grouping of the lattice filters 210. FIG. 6A illustrates the on-chip pathing using the layout shown in FIG. 5A for the first lattice filter 210a, and FIG. 6B illustrates the on-chip pathing using the layout shown in FIG. 5B for the first lattice filter 210a. The second lattice filter 210b and the third lattice filter 210c in both of the FIGS. 6A and 6B use the layout shown in FIG. 5A.

In FIG. 6A, the first lattice filter 210a is connected on a first side to a multiplexed signal port 610, which may be a signal source for a multiplexed signal 140 (when operating as a demultiplexer) or a signal destination for a multiplexed signal 140 (when operating as a multiplexer). On a second side, the second lattice filter 210b is connected to a first interleaved port 620a (generally or collectively, interleaved port 620) and the third lattice filter 210c is connected to a second interleaved port 620b. In some embodiments, the interleaved ports 620 are connected to Bragg interleavers 120, while in other embodiments (using multiple stages 150 of lattice filter interleavers 110 like in FIG. 1B), the interleaved ports 620 are connected to the multiplexed ports 610 of other lattice filter interleavers 110.

In FIG. 6B, the first lattice filter 210a is connected on a first side to a multiplexed signal port 610, which may be a signal source for a multiplexed signal 140 (when operating as a demultiplexer) or a signal destination for a multiplexed signal 140 (when operating as a multiplexer). Also on the first side, the second lattice filter 210b is connected to a first interleaved port 620a and the third lattice filter 210c is connected to a second interleaved port 620b. In some embodiments, the interleaved ports 620 are connected to Bragg interleavers 120, while in other embodiments (using multiple stages 150 of lattice filter interleavers 110 like in FIG. 1B), the interleaved ports 620 are connected to the multiplexed ports 610 of other lattice filter interleavers 110.

FIGS. 7A-7D illustrate layouts of Bragg interleavers 120, according to embodiments of the present disclosure. Each Bragg interleaver 120 includes a mode multiplexer 710 and a Bragg grating 720 tuned for the specific wavelengths of signals to be multiplexed or demultiplexed.

Figure 7A:
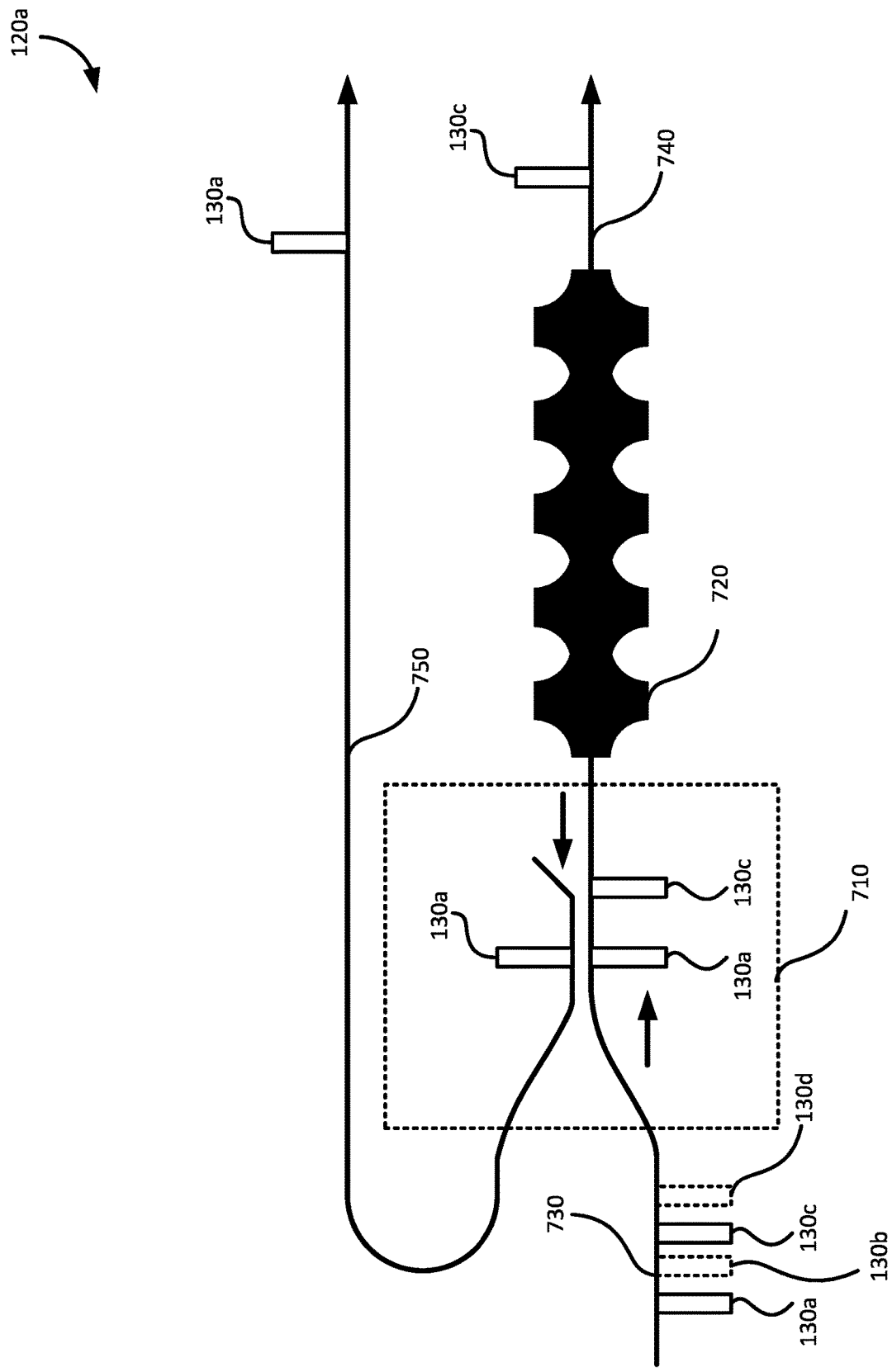
FIGS. 7A-7D illustrate layouts of Bragg interleavers, according to embodiments of the present disclosure.

The Bragg grating 720 induces a periodic variation in the refractive index of the transmission medium to transmit certain wavelengths and reflect others. As illustrated in FIG. 7A, the Bragg grating 720 for the first Bragg interleaver 120a reflects the wavelengths associated with the first individual signal 130a and permits transmission of the wavelengths associated with the third individual signal 130c. FIG. 7C illustrates an alternative construction where the Bragg grating 720 is instead designed to reflect the wavelengths associated with the third individual signal 130c and permit transmission the wavelengths associated with the first individual signal 130a; reversing the input/output of the individual signals 130 compared to FIG. 7A.

Figure 7B:
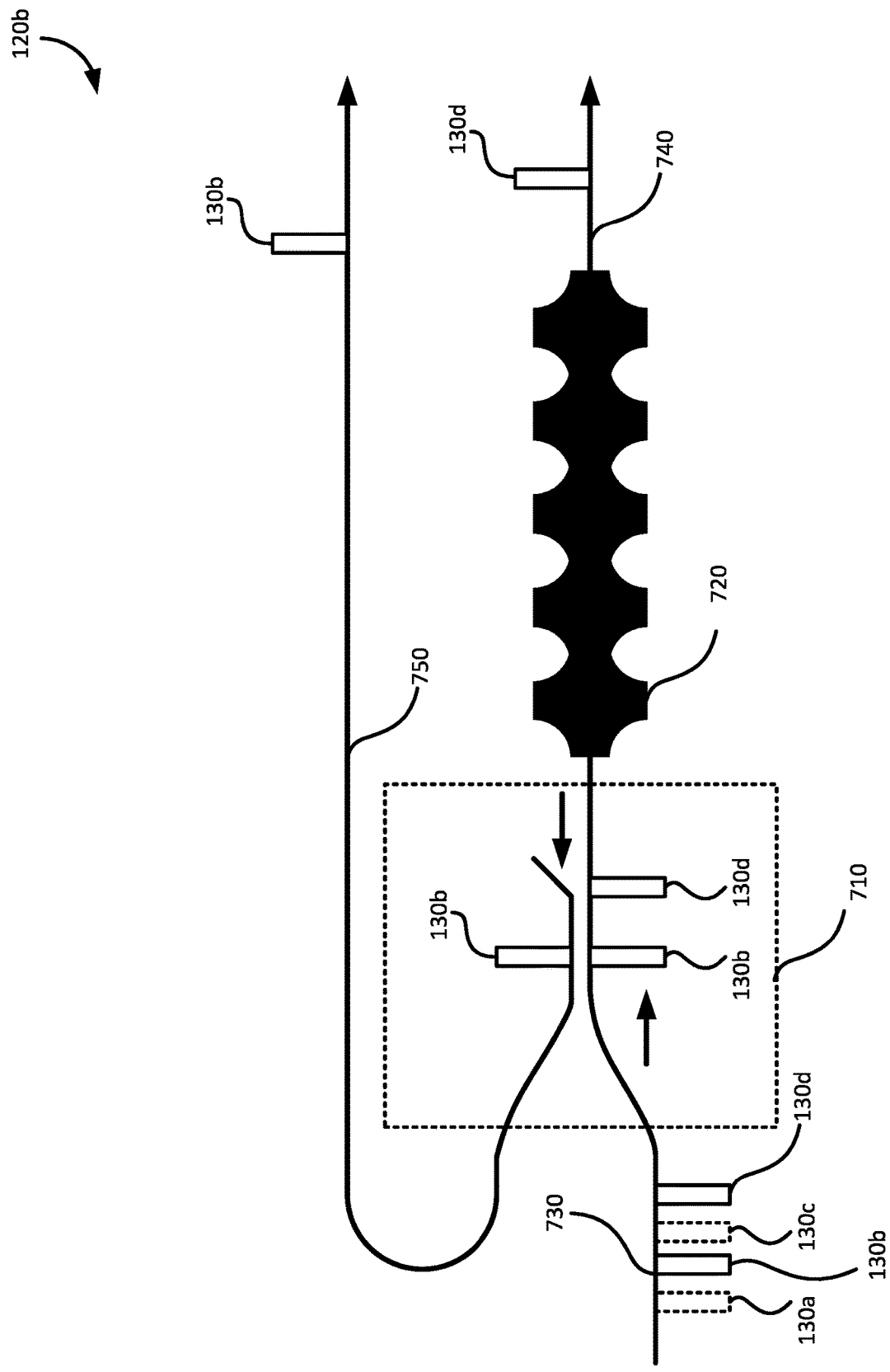
Figure 7C:
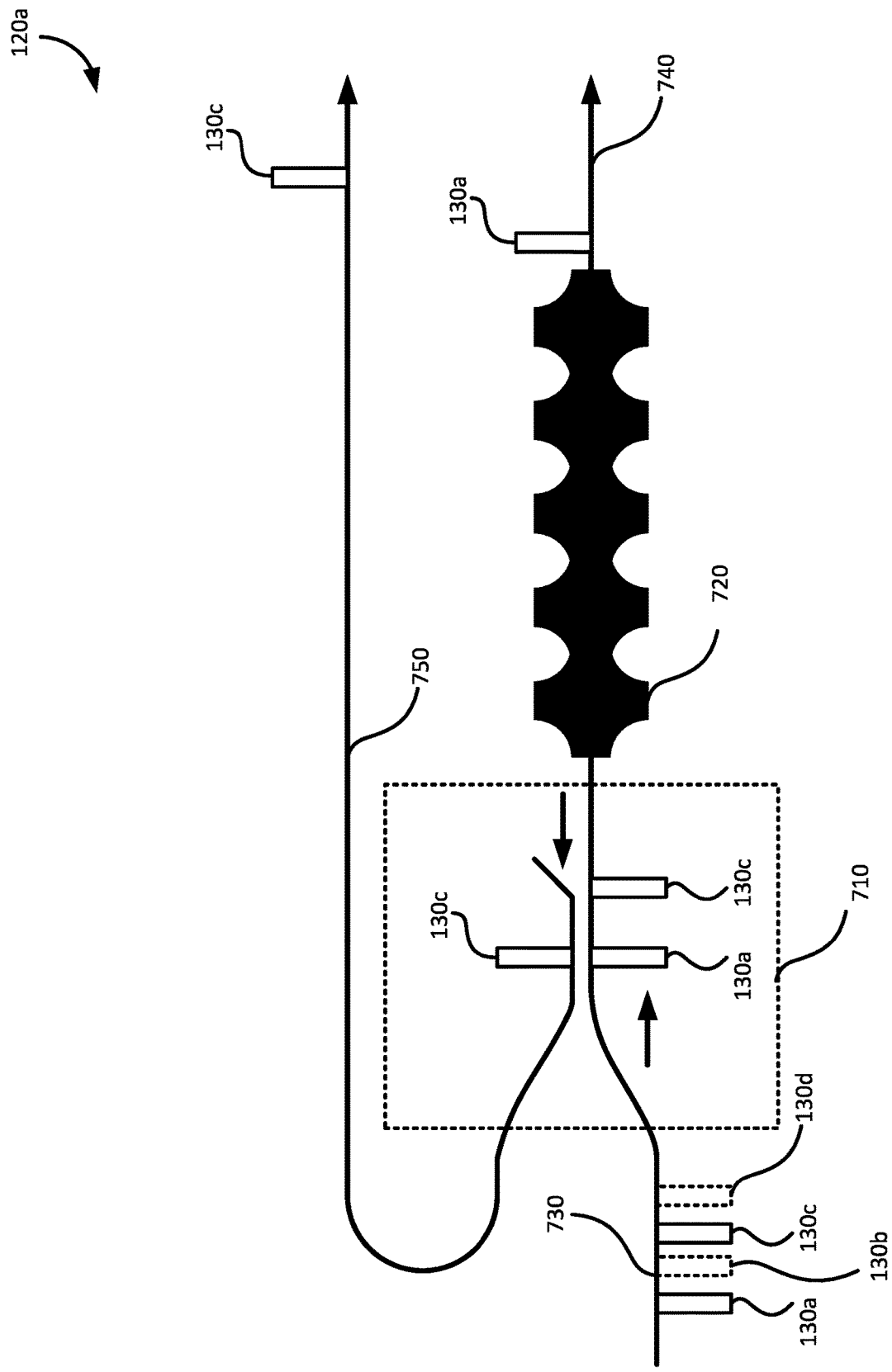
Figure 7D:
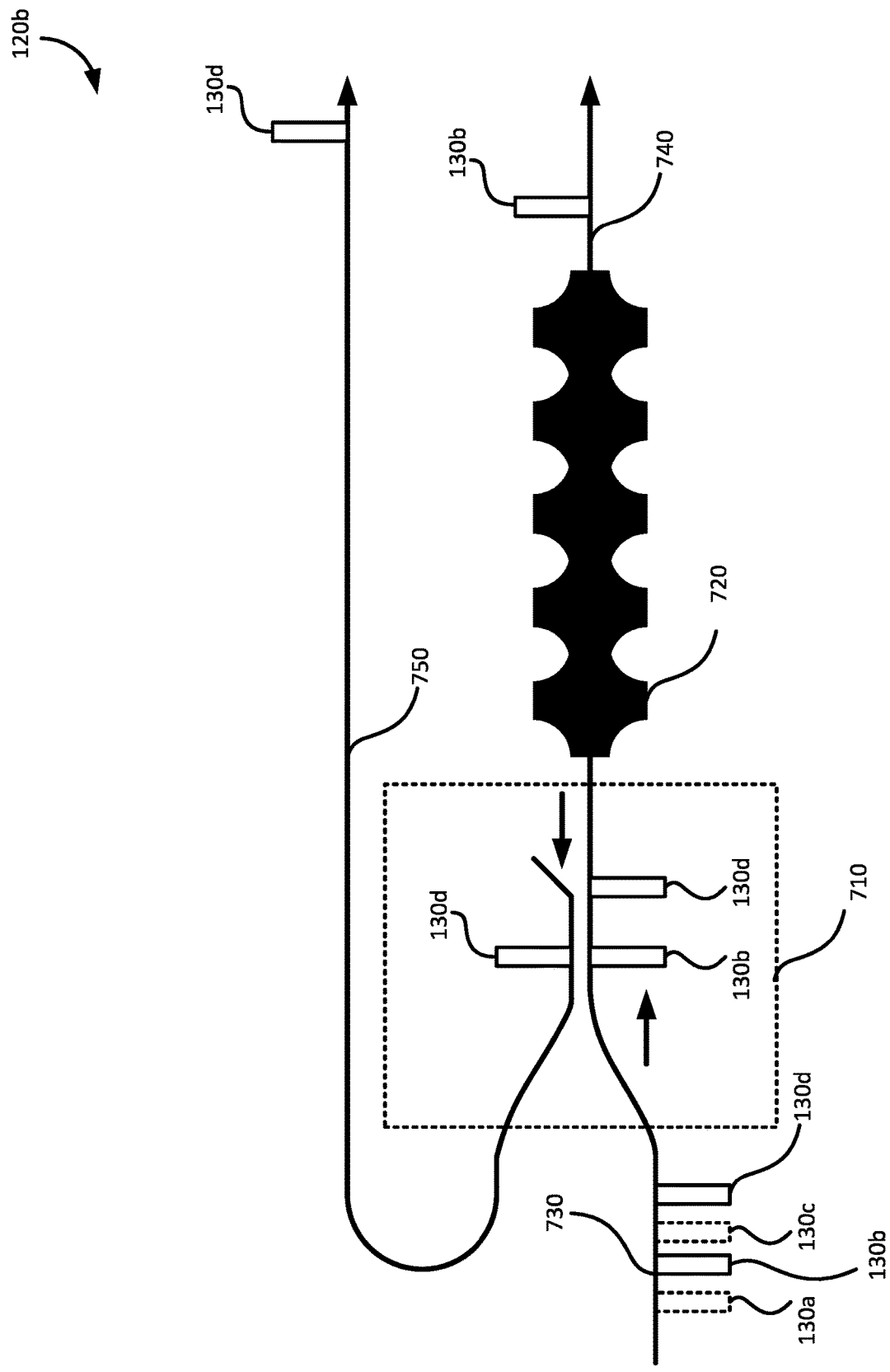

Similarly, as illustrated in FIG. 7B, the Bragg grating 720 for the second Bragg interleaver 120b reflects the wavelengths associated with the second individual signal 130b and permits transmission of the wavelengths associated with the fourth individual signal 130d. FIG. 7D illustrates an alternative construction where the Bragg grating 720 is instead designed to reflect the wavelengths associated with the fourth individual signal 130d and permit transmission the wavelengths associated with the second individual signal 130b; reversing the input/output of the individual signals 130 compared to FIG. 7B. Either arrangement shown in FIG. 7B or 7D may be paired with either arrangement shown in FIG. 7A or 7C.

When operated as a demultiplexer, the Bragg interleaver 120 receives an interleaved signal on a first signal arm 730 from an upstream lattice filter interleaver 110 that has removed half of the individual signals 130 (with the other half being sent to the mode multiplexer of the paired Bragg interleaver 120). The Bragg grating 720 allows one of the individual signals 130 to pass through to a second signal arm 740 (connected to an associated individual signal port), and reflects the other individual signal back to the mode multiplexer 710, which propagates the other individual signal 130. The mode multiplexer 710 includes a third signal arm 750, which receives the reflected individual signal 130 from the Bragg grating 720 and carries the reflected individual signal 130 to a separate individual signal port to process the two individual signals separately from one another.

For example, with reference to FIG. 7A, the first Bragg interleaver 120a receives a multiplexed signal that includes the first individual signal 130a and the third individual signal 130c on the first signal arm 730, where the second individual signal 130b and the fourth individual signal 130d have been routed to the second Bragg interleaver 120b (as in FIG. 7B or 7D). The first signal arm 730 carries the two individual signals 130 to the Bragg grating 720, which reflects the first individual signal 130a, but permits the second individual signal 130b to propagate to the second signal arm 740. The first individual signal 130a is reflected from the Bragg grating 720 onto the third signal arm 750.

When operated as a multiplexer, the Bragg interleaver 120 receives individual signals 130 on the second signal arm 740 and third signal arm 750, and combines the individual signals 130 onto the first signal arm 730 for a downstream lattice filter interleaver 110. The multiplexing of the individual signals 130 in a given Bragg interleaver 120 leaves spacing for other individual signals 130 (handled by other Bragg interleavers 120) for the downstream lattice filter interleavers 110 to handle for further multiplexing. The Bragg grating 720 allows the individual signal 130 received on the second signal arm 740 to pass through to the first signal arm 740. The mode multiplexer 710 propagates the other individual signal 130 onto the first signal arm 730 to reflects off of the Bragg grating 720 and redirect the other individual signal 130 to the downstream lattice filter interleaver 110.

For example, with reference to FIG. 7A, the first Bragg interleaver 120a receives a first individual signal 130a on the third signal arm 750 and the third individual signal 130c on the second signal arm 740, and multiplexes the two individual signals 130 together on the first signal arm 730 for receipt by a downstream lattice filter interleaver 110 (which receives the omitted second individual signal 130b and the fourth individual signal 130d from a second Bragg interleaver 120b (as in FIG. 7B or 7D)).

In various embodiments, the second signal arm 740 and the third signal arm 750 are connected to various signal destinations (when used as a demultiplexer) for further processing, or from various signal sources (when used as a multiplexer). These various destinations or sources may be on the same chip as the MUX/DeMUX 100 is fabricated on or a different chip, and are generally referred to as "ports". Each port is associated with a corresponding wavelength of signal, and in various embodiments, some of the ports may remain unconnected or otherwise not send/receive optical signals without affecting the operation of the MUX/DeMUX 100. For example, the third signal arm 750 may receive a corresponding individual signal 130 while the second signal arm 740 does not receive a corresponding individual signal 130, and the resulting output would include a "null" or zero-amplitude space in the interleaved signal where the signal from the second signal arm 740 would have been received.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A demultiplexer, comprising:
a first lattice filter interleaver comprising a plurality of lattice filters, each lattice filter including at least one phase delay line pair, each phase delay line of the phase delay line pair having a different dimensioning than the other phase delay line of the phase delay line pair, wherein the first lattice filter interleaver is configured to receive an input signal including a plurality of individual signals and to produce a first interleaved signal with a first subset of the plurality of individual signals and a second interleaved signal with a second subset of the plurality of individual signals;
a first Bragg interleaver configured to receive the first interleaved signal and produce a first output signal including a first individual signal of the plurality of individual signals and a second output signal including a second individual signal of the plurality of individual signals; and
a second Bragg interleaver configured to receive the second interleaved signal and produce a third output signal including a third individual signal of the plurality of individual signals and a fourth output signal including a fourth individual signal of the plurality of individual signals.

2. The demultiplexer of claim 1, wherein the plurality of lattice filters includes:
a first lattice filter configured to receive the input signal;
a second lattice filter connected to a first output of the first lattice filter and configured to produce the first interleaved signal; and
a third lattice filter connected to a second output of the first lattice filter and configured to produce the second interleaved signal.

3. The demultiplexer of claim 2, wherein each of the first lattice filter, the second lattice filter, and the third lattice filter include:
a first tap coupler;
a second tap coupler;
a third tap coupler;
a fourth tap coupler;
a first phase delay line pair connecting output arms of the first tap coupler to input arms of the second tap coupler;
a second phase delay line pair connecting output arms of the second tap coupler to input arms of the third tap coupler; and
a third phase delay line pair connecting output arms of the third tap coupler to input arms of the fourth tap coupler;
wherein a first output arm of the fourth tap coupler of the first lattice filter is connected to a first input arm of the first tap coupler of the second lattice filter; and wherein a second output arm of the fourth tap coupler of the first lattice filter is connected to a first input arm of the first tap coupler of the third lattice filter.

4. The demultiplexer of claim 3, wherein tap strengths for the first tap coupler, the second tap coupler, the third tap coupler, and the fourth tap coupler for the second lattice filter are set to be equivalent to respective tap strengths for the third lattice filter and to be different from respective tap strengths for the first lattice filter.

5. The demultiplexer of claim 1, wherein each of the first Bragg interleaver and the second Bragg interleaver include:
   a mode multiplexer; and
   a Bragg grating connected to the mode multiplexer.

6. The demultiplexer of claim 5, wherein the Bragg grating of the first Bragg interleaver is configured for a different wavelength than the Bragg grating of the second Bragg interleaver.

7. The demultiplexer of claim 1, further comprising:
   a second lattice filter interleaver configured to receive an origin signal including the first individual signal, the second individual signal, the third individual signal, the fourth individual signal, a fifth individual signal, a sixth individual signal, a seventh individual signal, and an eighth individual signal and configured to produce the input signal and a second input signal that includes the fifth individual signal, the sixth individual signal, the seventh individual signal, and the eighth individual signal.

8. A multiplexer, comprising:
   a first Bragg interleaver configured to receive a first individual signal of a first wavelength and a second individual signal of a second wavelength and produce a first interleaved signal including the first individual signal and the second individual signal;
   a second Bragg interleaver configured to receive a third individual signal of a third wavelength and a fourth individual signal of a fourth wavelength and produce a second interleaved signal including the third individual signal and the fourth individual signal, wherein the third wavelength is between the first wavelength and the second wavelength and the fourth wavelength is greater than the first wavelength and the second wavelength; and
   a first lattice filter interleaver comprising a plurality of lattice filters, each lattice filter including at least one phase delay line pair, each phase delay line of the phase delay line pair having a different dimensioning than the other phase delay line of the phase delay line pair, wherein the first lattice filter interleaver is configured to receive the first interleaved signal and the second interleaved signal to produce a multiplexed output signal including the first individual signal, the second individual signal, the third individual signal, and the fourth individual signal.

9. The multiplexer of claim 8, wherein the plurality of lattice filters includes:
   a first lattice filter configured to produce the multiplexed output signal;
   a second lattice filter connected to a first input of the first lattice filter and configured to receive the first interleaved signal; and
   a third lattice filter connected to a second input of the first lattice filter and configured to receive the second interleaved signal.

10. The multiplexer of claim 9, wherein each of the first lattice filter, the second lattice filter, and the third lattice filter include:

a first tap coupler;
a second tap coupler;
a third tap coupler;
a fourth tap coupler;
a first phase delay line pair connecting output arms of the first tap coupler to input arms of the second tap coupler;
a second phase delay line pair connecting output arms of the second tap coupler to input arms of the third tap coupler; and
a third phase delay line pair connecting output arms of the third tap coupler to input arms of the fourth tap coupler;
wherein a first input arm of the fourth tap coupler of the first lattice filter is connected to a first output arm of the first tap coupler of the second lattice filter; and
wherein a second input arm of the fourth tap coupler of the first lattice filter is connected to a first output arm of the first tap coupler of the third lattice filter.

11. The multiplexer of claim 10, wherein tap strengths for the first tap coupler, the second tap coupler, the third tap coupler, and the fourth tap coupler for the second lattice filter are set to be equivalent to respective tap strengths for the third lattice filter and to be different from respective tap strengths for the first lattice filter.

12. The multiplexer of claim 8, wherein each of the first Bragg interleaver and the second Bragg interleaver include:
   a mode multiplexer; and
   a Bragg grating connected to the mode multiplexer.

13. The multiplexer of claim 12, wherein the Bragg grating of the first Bragg interleaver is configured for a different wavelength than the Bragg grating of the second Bragg interleaver.

14. The multiplexer of claim 12, wherein the first lattice filter interleaver is configured to provide the multiplexed output signal to a second lattice filter interleaver connected to a second multiplexer that provides a second multiplexed output signal to the second lattice filter interleaver, wherein the second multiplexed output signal includes a fifth individual signal, a sixth individual signal, a seventh individual signal, and an eighth individual signal, wherein the second lattice filter interleaver produces a third multiplexed output signal that includes the first through eighth individual signals interleaved with one another.

15. A device, comprising:
   a first lattice filter interleaver comprising a plurality of lattice filters, each lattice filter including at least one phase delay line pair, each phase delay line of the phase delay line pair having a different dimensioning than the other phase delay line of the phase delay line pair, wherein the first lattice filter interleaver is connected on a first side to a multiplexed signal port and connected on a second side to:
      a first Bragg interleaver that is connected to a first individual signal port and a second individual signal port; and
      a second Bragg interleaver connected to a third individual signal port and a fourth individual signal port.

16. The device of claim 15, wherein the first individual signal port is configured for a first wavelength, the second individual signal port is configured for a second wavelength different from the first wavelength, the third individual signal port is configured for a third wavelength between the first wavelength and the second wavelength, and the fourth individual signal port is configured for a fourth wavelength greater than the second wavelength.

17. The device of claim 15, wherein the plurality of lattice filters comprises:

a first lattice filter connected to the multiplexed signal port;

a second lattice filter connected to a first port of the first lattice filter and connected to the first Bragg interleaver; and a third lattice filter connected to a second port of the first lattice filter and connected to the second Bragg interleaver; and wherein tap strengths for tap couplers comprising the first lattice filter are set to be equivalent to respective tap strengths for tap couplers comprising the second lattice filter and the third lattice filter.

18. The device of claim 15, wherein the plurality of lattice filters comprises:

a first lattice filter connected to the multiplexed signal port;

a second lattice filter connected to a first port of the first lattice filter and connected to the first Bragg interleaver; and a third lattice filter connected to a second port of the first lattice filter and connected to the second Bragg interleaver; and wherein tap strengths for tap couplers comprising the first lattice filter are set to be different from respective tap strengths for tap couplers comprising the second lattice filter and the third lattice filter.

19. The device of claim 15, further comprising:

a second lattice filter interleaver including a fifth individual signal port, the multiplexed signal port, and a second multiplexed signal port; and a third lattice filter interleaver connected on a third side to the second multiplexed signal port and on a fourth side to a third Bragg interleaver that is connected to a fifth individual signal port and a sixth individual signal port and a fourth Bragg interleaver connected to a seventh individual signal port and an eighth individual signal port.

20. The device of claim 19, wherein the first Bragg interleaver comprises:

a first mode multiplexer connected to the first individual signal port and the first lattice filter interleaver; and a first Bragg grating connected to the first mode multiplexer and the second individual signal port; and wherein the second Bragg interleaver comprises:

a second mode multiplexer connected to the third individual signal port and the first lattice filter interleaver; and a second Bragg grating connected to the second mode multiplexer and the fourth individual signal port.

* * * * *